US005705215A

United States Patent [19]
Riach, Jr.

[11] Patent Number: 5,705,215
[45] Date of Patent: Jan. 6, 1998

[54] MAGNETIC METHOD FOR EXTENDING THE SHELF LIFE OF FOOD PRODUCTS

[76] Inventor: George Riach, Jr., 10424 Cary Cir., Cypress, Calif. 90720

[21] Appl. No.: 602,246

[22] Filed: Feb. 15, 1996

Related U.S. Application Data

[60] Division of Ser. No. 164,707, Dec. 10, 1993, Pat. No. 5,527,105, which is a continuation-in-part of Ser. No. 977,292, Nov. 16, 1992, abandoned, which is a continuation-in-part of Ser. No. 788,803, Nov. 7, 1991, abandoned.

[51] Int. Cl.$^6$ ............................................. A23L 3/00
[52] U.S. Cl. ............................................. 426/237; 426/524
[58] Field of Search ........................ 426/234, 237, 426/524; 312/406; 428/900

[56] References Cited

U.S. PATENT DOCUMENTS 3,449,093  6/1969  Baxt et al. ................................. 55/100

FOREIGN PATENT DOCUMENTS 2501508  3/1981  France ................................. 426/234

OTHER PUBLICATIONS

Dialog Data Base, File 347, Dialog Acc. No. 03955679, Abstracting Publication No. 04-320779 (JP 4320779A), Nov. 11, 1992.

*Primary Examiner*—George Yeung
*Attorney, Agent, or Firm*—Francis X. LoJacono

[57] ABSTRACT

A method and apparatus for extending the shelf life of fresh food products that provides magnetic strips, matting formed from the strips, and pads having magnetic north sides and magnetic south sides, wherein the negative magnetic north sides of the magnetic strips or pads are arranged to impinge on the fresh food products stored in a low-temperature environment.

4 Claims, 3 Drawing Sheets

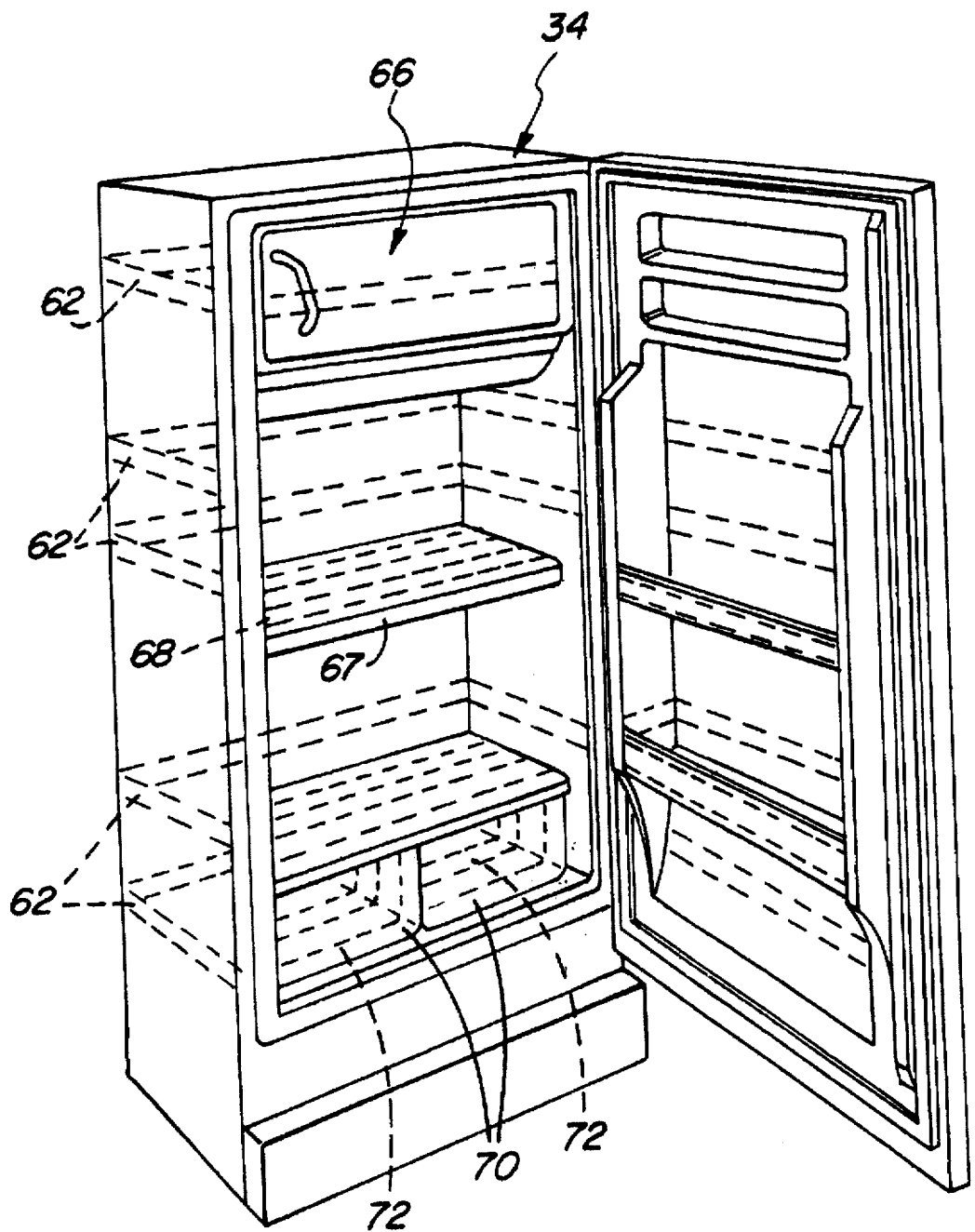

MAGNETIC METHOD FOR EXTENDING THE SHELF LIFE OF FOOD PRODUCTS

RELATED APPLICATIONS

This application is a Divisonal application of application Ser. No. 08/164,707 filed Dec. 10, 1993, now U.S. Pat. No. 5,527,105, which is a continuation-in-part of of application Ser. No. 07/977,242, filed Nov. 16, 1992, now abandoned, which is a continuation-in-part of application Ser. No. 07/788,803, filed Nov. 7, 1991, now abandoned.

BACKGROUND OF THE INVENTION

1. Field of the Invention

The present invention relates generally to a method and apparatus for extending the shelf life of food products, and more particularly to an apparatus that provides magnetic strips, matting and pads, having a magnetic north side that will affect the molecular structure of the natural fluids found within various food products to bond together when they are subjected to the north magnetic field of the magnetic pad. The method further includes subjecting the magnetic pad or pads to a low temperature of refrigerated environment so as to cause the density of the magnetic field to greatly increase in magnitude.

2. Description of the Prior Art

As is well known in the art various problems and difficulties are encountered in providing a simple uncomplicated means for extending the shelf life of fresh food products, particularly citrus produce such as oranges, grapefruits, lemons, etc., as well as tomatoes, onions, etc. The shelf life of dairy products (milk, cheese, etc.), eggs, vegetables, and more particularly meats, is known to increase when they are stored under optimum refrigeration conditions. However, it is also known that such food products as herein mentioned can also be provided with an additional extended shelf life when they are subjected to methods and/or apparatuses that include controlled pulsed, high-volage electric field treatment.

One can refer to U.S. Pat. Nos. 4,695,472 and 4,838,154 that are both inventions of Joseph E. Dunn and Jay S. Pearlman, wherein methods and apparatus for extending the shelf life of fluid products are disclosed. The inventions in these patents provide an apparatus as well as a method to subject various foodstuffs to sequential plurality of high electric field pulses, having specified field strengths for a given duration. This particular apparatus is a rather complicated arrangement including a high-voltage pulse, electric field treatment apparatus, a treatment apparatus monitor, a system control and analysis microprocessor, a production line interface, and a heat exchanger that provide a refrigerated, electrical field-treated foodstuff stream for an aseptic packaging device.

However, a more simple apparatus for preserving foods is disclosed in U.S. Pat. No. 694,261, having a chest including shelves covered with asbestos, a metal plate and a door. A metal tank is supported on the bottom shelf and is adapted to contain water. The metal plate is electrically connected to the water tank whereby the shelves and water in the tank are heated to kill the bacteria in the food products placed in the water or on the metal plate of the shelf.

In U.S. Pat. No. 760,173, to A. W. Ball there is disclosed a process for curing and preserving meats.

The applicant is knowledgeable and well versed in magnetic field therapy which has been known for some time. However, recent developments in this art have opened many areas in the health fields for magnetic therapy which involves the use of unipolar magnets having opposing north and south poles. Accordingly, the applicant has been doing research with unipolar magnets in the area of nutritional health care including experimentation with the positive and negative magnetic field with respect to extending the shelf life of food products. Such magnets are now available in both rigid and flexible form and in any desired length, width, thickness and diameter to meet the many needs that might be required in new fields of technology.

A book entitled "New Hope for Physical and Emotional Illness" by William Howard Philpott, M.D., and Walter C. Rawls, Jr., D. Sc., which is available through ENVIRO-TECH PRODUCTS, 17171 S.E. 29th Street, Choctaw, Okla. 73020, discusses the use of unipolar magnets and particularly the effects of using the north (or negative) and south (or positive) poles.

It is well established that the north and south poles of unipolar magnets provide quite different effects on living metabolic systems. These effects can be briefly summarized in Table "A" as follows:

TABLE A

| NORTH POLE ENERGY | SOUTH POLE ENERGY |
|---|---|
| Stimulates alkali metabolic response | Stimulates acid metabolic response |
| Slows down metabolic process | Speeds up metabolic process |
| Reduces multiplication of microorganisms | Speeds up multiplication of microorganisms |
| Increases oxygenation of tissue - indirect evidence | Decreases oxygenation of tissue - indirect evidence |

It is apparent from this tabulated data that benefit is derived primarily from exposure to the north pole energy, and that extended exposure to south pole energy should be avoided.

Other work has been done in America by many scientists and medical professionals, among them Dr. A. Roy, Walter C. Rawles, Albert Roy Davis, and by Professor M. F. Barnothy. They have been able through extensive and repeated experiments to prove that magnetic currents positively influence metabolism and support the formation of amino acids (the building blocks for protein) in cells.

Based on the above information applicant has conducted various successful research experiments relating to treating foods of all types which includes subjecting fruits, vegetables, meats, etc., to north pole energy of unipole magnets under various refrigerated conditions which will be disclosed herein.

OBJECTS AND ADVANTAGES OF THE INVENTION

The primary object of the present invention is to provide both a new method and apparatus that employ a permanent magnet or a plurality of magnets arranged to define a mat that is used as a base on which food products, and more particularly fluid food products, are placed thereon or adjacent thereto so as to be subjected to and affected by the north magnetostatic field of the magnetic mat.

When fluid food products such as fruits, vegetables, meats and various dairy products - - - and particularly those that have substantial amounts of fluid stored within their structure - - - are placed in a north magnetic field, they become subjected to the magnetic radiation which causes the molecular composition to be uniformly polarized so as to bind together. This polarization causes many beneficial effects to occur within a particular food product. The north or binding side of the magnetic field is substantially enhanced by subjecting magnetic strips, mats or pads to a suitably low temperature of 70° F. or lower, whereby the magnet or magnets will increase its magnetic flux in density rating, causing the molecules of the liquid within the food product to bind together in what is often referred to as a substantially tight "wetter" condition. This "wetter" condition establishes a much longer shelf-life condition for foods that are stored in the combined environment that includes a north magnetic field and a selected low temperature.

It is another object of the present invention to provide a method and apparatus that is defined by a magnet strip material, mat or pad having a magnetic north side, wherein the strip, mat or pad comprises a flexible rubber-like material or plastic that is impregnated with a magnetic substance so as to establish a magnetic north field.

Still another object of the present invention is to provide a method and apparatus as herein recited wherein the mat is formed from a plurality of flexible magnetic strips that are interwoven with each other to produce a strong north magnetic flux, and wherein the mat is capable of conforming to various surface configurations when placed in a refrigerated enclosure of a typical refrigerator unit or in vegetable and/or meat storage bins.

A further object of the invention is to provide an apparatus of this character in combination with a refrigerator having a plurality of elongated magnetic strips arranged either vertically or horizontally within the wall structure of a refrigerator unit or mounted on the inside walls of the refrigerator compartment, wherein the magnetic strips would by positioned in an equally spaced, side-by-side arrangement.

A still further object of the invention is to provide an apparatus of this type and character that is simple in its structure and has no moving parts, making it easy to install, use, service and maintain.

It is still another object of the present invention to provide a device of the character that is relatively inexpensive to manufacture as elongated matting whereby various sizes of mats can be readily formed as needed.

The foregoing is a description of several preferred embodiments of the invention which are given here by way of example only. The invention is not to be taken as limited to any of the specific features as described, but comprehends all such variations thereof as come within the scope of the appended claims.

BRIEF DESCRIPTION OF THE DRAWING FIGURES

With the above and related objects in view, the invention consists in the details of construction and combination of parts, as will be more fully understood from the following description, drawings and numbered parts, in which:

FIG. 8 is a pictorial view of a refrigerator having the door in an open position with the magnetic strips in dotted lines.

DETAIL DESCRIPTION OF THE INVENTION

Figure 1:
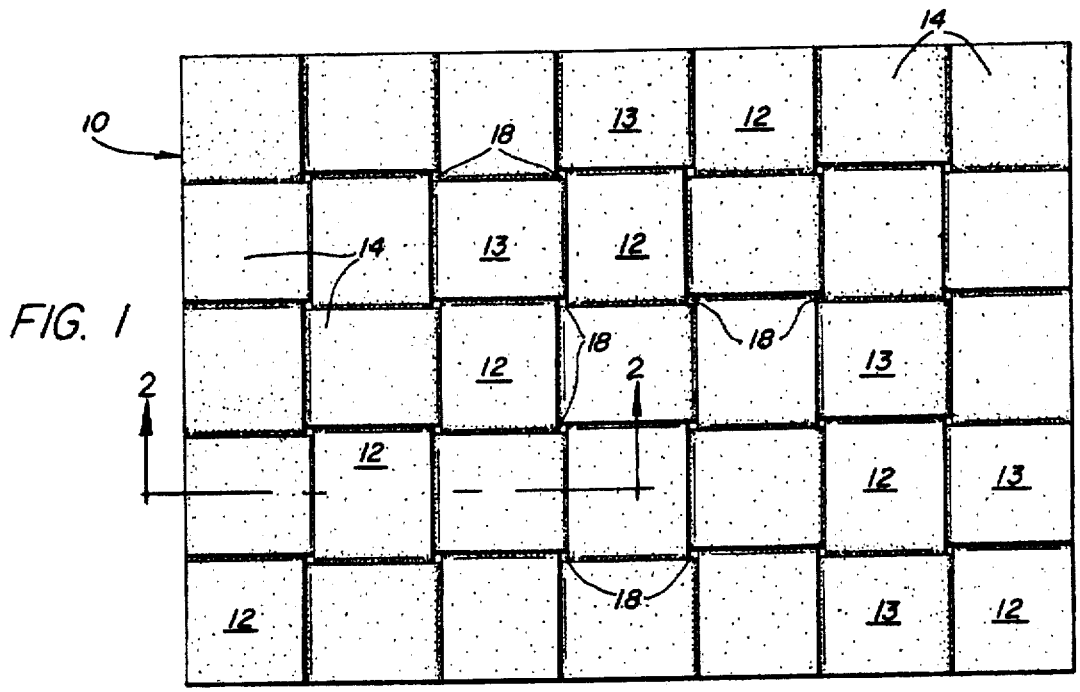
FIG. 1 is a top plan view of the embodiment showing the construction of a plurality of magnetic strips that are woven to define a magnetic mat.
Figure 2:
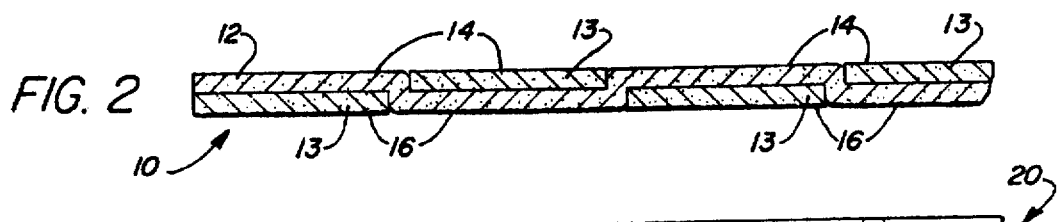
FIG. 2 is an enlarged cross-sectional view taken substantially along line 2—2 of FIG. 1.

Referring more particularly to the embodiment as illustrated in FIGS. 1 and 2, there is shown a magnetic mat, generally indicated at 10, which comprises a plurality of flexible strips 12 and 13 that are formed from magnetically impregnated plastic or rubber material well known in the art, such as the Scotch® Brand magnet tape which is a flexible, polymer-bonded product and the Plastiform® Brand of flexible permanent magnetic tape which has the energy product 1.1×10 Gauss-Oersted or a residual induction of 2225 gauss. Magnetic strips 12 and 13 are shown as being interwoven with each other so as to form mat 10. Magnetic strips 12 are illustrated in FIG. 1 as being perpendicularly arranged with respect to the horizontally positioned magnetic strips 13. Both magnetic strips 12 and 13 are defined by a typical north magnetic side 14 and a south magnetic side 16. The principal concept of the present invention is mainly concerned with the negative or north side of the mat. However, the positive or south magnetic side 16 has its desired applications of use which will be hereinafter referred to. The north magnetic side 14 is illustrated as being the upper exposed side of mat 10, whereas the south or positive magnetic side is shown as the bottom side of the mat. As will be noted in the foregoing description of the method of use, the negative magnetic side must be positioned so that the negative field is directly exposed to the food products during the storage of treated food.

The magnetic strips 12 and 13 may be woven in a very tight close configuration. However, in the preferred arrangement, as indicated in FIG. 1, there are provided openings or apertures 18 which are defined at the woven junctions of the webbed strips. Apertures 18 provide a means by which cold air can be readily circulated to pass through mat 10, thereby allowing for a well-blanced air flow, not only in and around the mat structure but also in and around the food products that would be placed on the negative side of mat 10.

Figure 3:
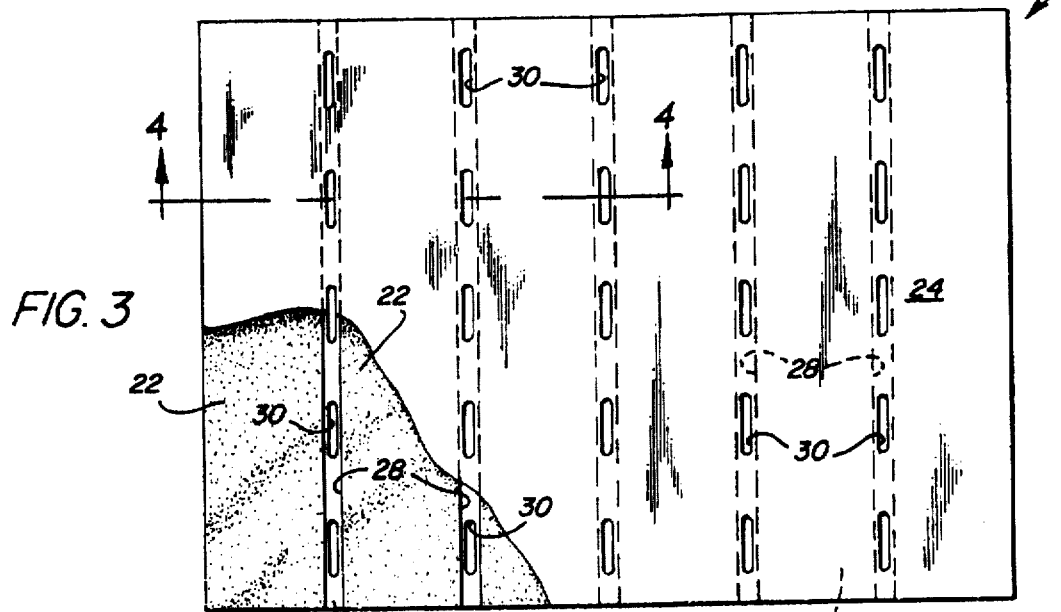
FIG. 3 is a top plan view of another embodiment of the invention wherein a portion of the cover sheet is broken away to more clearly show the spaced-apart arrangement of the elongated magnetic strips and the corresponding apertures along the longitudinal spaces.
Figure 4:
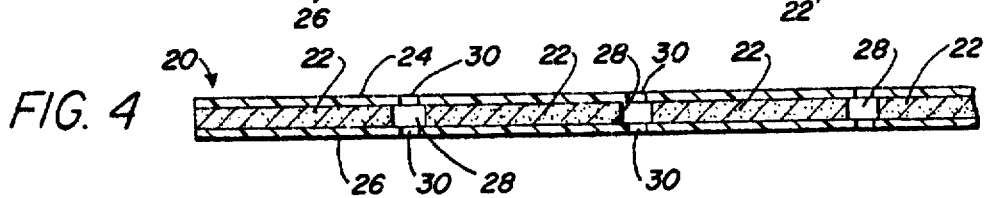
FIG. 4 is an enlarged cross-sectional view taken substantially along 4—4 of the embodiment illustrated in FIG. 3.

Referring now to the embodiment as illustrated in FIG. 3 and 4, there is shown an alternative arrangement of the invention wherein the mat, generally indicated at 20, is constructed by means of a plurality of elongated magnetic strip members 22 of the type and character as described above. That is, the magnetic strips are formed from one of many suitable rubber of flexible magnetic plastic materials. The magnetic strip members 22 can be of any suitable length, width or thickness that might be required to meet a particular application or environment. The thickness of the magnetic strip is generally used to determine the gauss value (residual induction) of the magnetic flux. It is contemplated that mat 20 will be formed from a large matting that can be readily cut and shaped so as to be adapted to a suitable configuration for its particular use and location. Many such uses will hereinafter be indicated.

Magnetic strips 22 are fixedly secured and mounted between two thin flexible plastic sheets 24 and 26 that define a means by which magnetic strips 22 are secured in parallel spaced relation with each other. The material composition of both the magnetic strips 22 and mounting sheets will be such that the matting can be readily cut to any necessary size and configuration to fit a particular shelf or refrigerated food bin such as commonly found in supermarkets. The matting is particularly useful in a refrigerated environment as a liner in refrigerated compartments and trucks that are designed for shipping fruits and vegetables.

Air ducts or passages are defined by the elongated channels 28 that are formed by the spaced-apart magnetic strips 22, and the oppositely disposed mounting sheets 24 and 26, as seen in the cross-sectional view of FIG. 4. Outlet means are provided in the respective mounting sheets which are illustrated as a multiplicity of elongated apertures 30 that are equally spaced apart along air ducts. Apertures 50 in both upper sheet 24 and lower sheet 26 are shown aligned in pairs to allow free flow of cold air to pass through the matting. This provides two functions - - - one to properly refrigerator the food products and the other to effectively increase the gauss rating of the negative magnetic flux. When in use, the upper outer facing side of mat 20 should be the negative magnetic field which radiates outwardly to penetrate the food products that are exposed to the negative radiating flux.

However, it is contemplated that the magnetic strip can also be formed as a single pad having elongated slots or channels formed therein so as to define a plurality of air passages, as described above, to provide a means to allow air to flow through the magnetic pad and around the food product. Cover sheets having apertures formed therein would be secured to each side of the pad.

It is well established that magnetic fields within a solid magnetized material are substantially increased by subjecting the magnetized material to a substantially low-temperature environment such as passing cold air over the magnet or placing the magnet within a refrigerated environment, as hereinbefore mentioned. The reduction of temperature increases the strength of the radiating gauss of the magnetic field.

For years it was customary to consider magnetism as one unit of energy. However, it has been demonstrated conclusively that magnetism consists of two energies that have opposite biological effects when these energies are separated. It is the balance between these two energies that governs metabolism. Magnetism is a push-and-pull system. The clockwise spin of the negative magnetic field pulls. It should be understood that both negative magnetic fields and positive magnetic fields are magnetic energy with a 180 degree opposite response in biological systems. Life energy is the balance between these two systems. The positive magnetic pole is acidifying and the negative magnetic pole is alkalinizing in terms of biological response to single magnetic fields from a unipole magnet. Biological life has a balance between acidity and alkalinity. Another important issue is the demonstrated evidence that the positive magnetic pole is inflammatory evoking and the negative magnetic pole is anti-inflammatory and inflammatory resolving. Understanding the oppositeness of biological responses evoked by the separate positive and negative magnetic fields is critically important because with this knowledge exposure of tissue to single magnetic poles can provide a predictable governing ability over the biological responses being evoked in those tissues. Inflammation is characteristically an aspect of degenerative disease. This inflammation can be controlled by exposure to a negative magnetic field. Accordingly, exposing food products (more particularly fluid food products) to a negative magnetic field having a high-density gauss value has been found to affect the food products in such a manner as to substantially prolong the shelf life for weeks and in some applications to as much as a month or more. That is, the north or binding side of the magnetic field reduces acids in fluid food products such as tomatoes, lemons, oranges, grapefruits, onions, ect. The north side of the magnetic field changes the acids in foods, such as refrigerated vegetables and meats, to make them alkaline, further reducing the rate at which the food products will be damaged and spoiled.

It has been further found that placing left-over foods in a negative magnetic environment will lock in the flavors of the food, and increase the sugar content, thereby enhancing the left-over foods to the extent that they are as flavorable, if not more flavorable, as when they were originally cooked a week or so before storing.

Thus, it is important to note that the magnetic matting must be positioned so that the north magnetic field fully encompasses the food products so that are being treated by the radiating north or negative magnetic flux emanating from the magnetic matting. If the matting is to be placed in a typical refrigerated counter that is generally several feet long, the matting is positioned directly over the refrigerated portion of the counter with the positive or south side of the magnetic matting resting against the counter, and the negative or north side arranged to support the food products stored in open refrigerated counters, whereby the produce is kept as fresh as possible for as long as possible. The produce is generally kept moist by spraying with water to help extend the shelf life.

Figure 5:
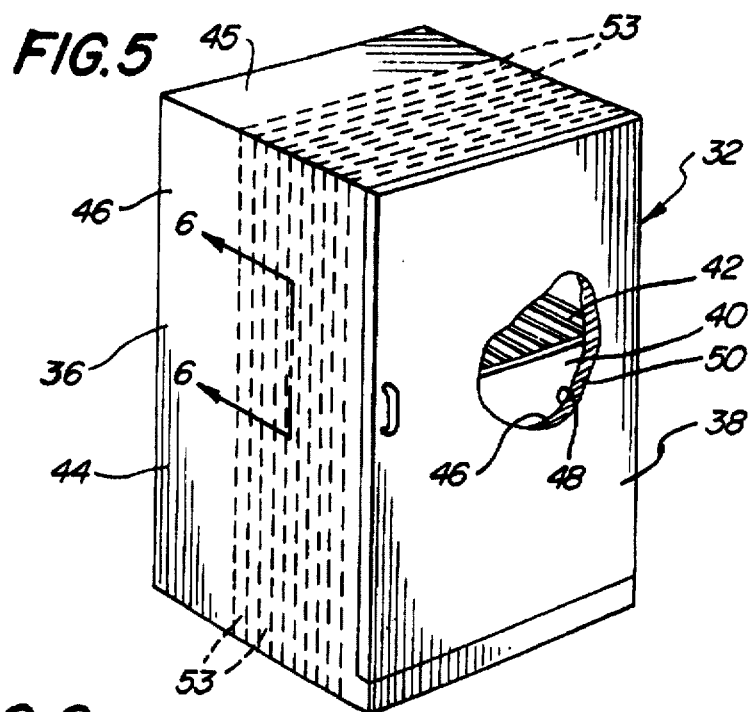
FIG. 5 is a perspective view of a refrigerator showing in dotted line the arrangement of a plurality of magnetic strips mounted within the body of an upright refrigerator.
Figure 6:
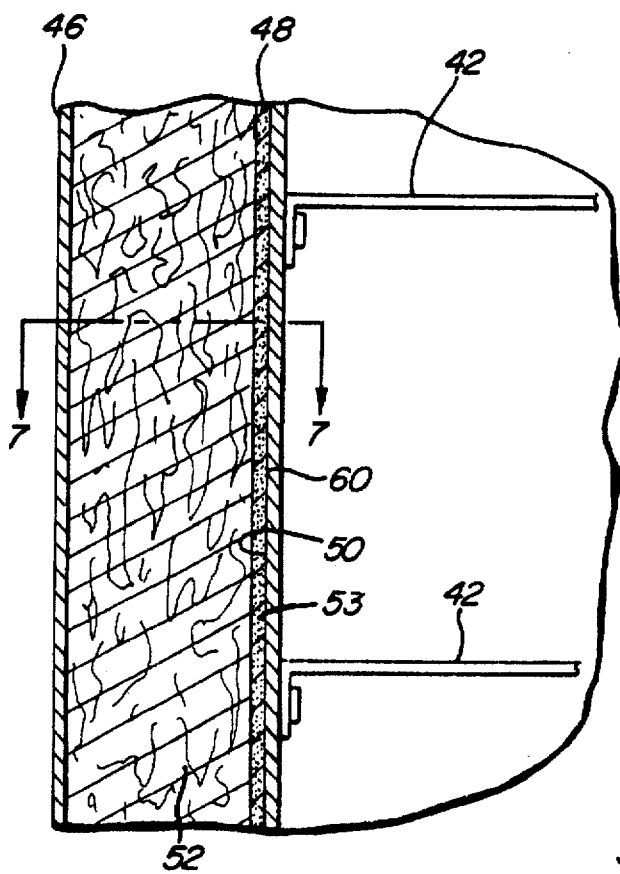
FIG. 6 is an enlarged cross-sectional view taken substantially along line 6—6 of FIG. 5.
Figure 7:
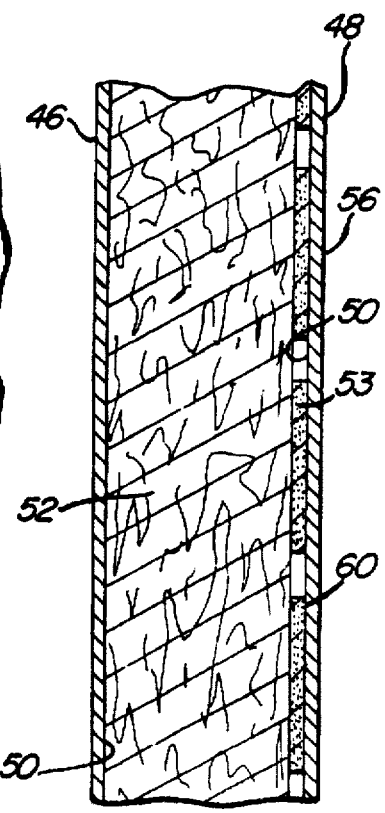
FIG. 7 is a cross-sectional view taken substantially along line 7—7 of FIG. 6.

Referring more particularly now to FIGS. 5 through 8, there are illustrated two examples of domestic type refrigerators which are respectively indicated at 32 and 34 in FIGS. 5 and 8. In FIG. 5, refrigerator 32 is shown having housing 36 and door 38 in which is defined a refrigerator compartment 40 having shelves 42 mounted therein. Housing 36 is shown having side walls 44 and a top wall 45 which comprise an outer metal sheet 46 and a typically inner plastic sheet 48 that define space 50, wherein insulation material 52 is positioned therein. Door 38 is also constructed the same. A plurality of magnetic strips 53 are indicated by dotted lines in FIG. 5, which are arranged peripherally around inner sheet 48 and may be positioned against the outer surface 56 or the inner surface 58 of the inner sheet within the insulated space 50, as shown in FIGS. 6 and 7. Magnetic strips 53 are also shown as being equally spaced apart and arranged longitudinally within insulated space 50 and affixed to the inner surface 58 of each inner sheet 48. Still further, it is important to note that strips 53 are affixed to the inner surface of each inner sheet with its negative magnetic side 60 secured to the interior sheet 48, whereby the negative magnetic field of each magnetic strip is directed outwardly so as to radiate within compartment 40. Hence, any food that is stored within compartment 40 will be subjected to only the negative magnetic field for the purposes as is herein above described.

In FIG. 8, refrigerator 34 is shown having a plurality of magnetic strips 62 that are also indicated as being located within the wall structure of the refrigerator. However, the positioning of the strips shows that they are mounted horizontally within the insulated wall space and are spaced much wider apart than as illustrated in FIGS. 5, 6 and 7. Here too, magnetic strips 62 are arranged with their magnetic negative sides facing inwardly of compartment 64.

Refrigerator compartment 64 includes a freezer 66 having a least one magnetic strip mounted adjacent thereto, shelves 67 that are adapted with magnetic strips 68 mounted thereon, and drawers or bins 70 that are also provided with their own magnetic strips 72. The inner structure of door 74 is also shown with suitably positioned magnetic strips. Accordingly, various arrangements and positions within the compartments of the magnetic strips are possible as one skilled in the art can recognize.

It is also contemplated that magnetic matting can be employed within various storage bins instead of magnetic strips, wherein the matting is sized to fit in the bottom of designated bins with the north magnetic side facing upwardly.

EXAMPLE I

A number of fresh food products were purchased at a local food chain store for the purpose of ascertaining the bacterial changes that would effect the various food products during a given 31 day period when three identical selected groups of food products are subjected to three different magnetic environments, a north (negative) magnetic environment, a south (positive) environment, and a typical magnetic-free environment.

The fresh food products that were used for testing consisted of the following:

1. Yogurt; (3 containers) taken from the same store and refrigerator, each container having the same expiration date for sale.
2. Honeydew melon cut in quarter sections with each sections being equal, three of which was selected for use.
3. Avocados; six were purchased, each were fresh, firm and weighed the same.
4. Peaches; three peaches were selected for testing having the same size and firmness.
5. Tomatoes (Devine Toms); three selected for testing.
6. Tomatoes (Cherry); one box used for periodic testing for firmness and flavor.
7. Kiwi fruit; six kiwis all firm and fresh.
8. Strawberries; three baskets, all field fresh.

All of the above food products were used for testing the results of the claimed method as recited hereinafter, wherein a typical household refrigerator was used with the metal racks being removed and replaced by three wooden racks. This was done to eliminate any residual magnetic build up that might be present in the metal racks. The refrigerator compartment was set at the highest temperature, well above freezing, but cool enough to maintain normal refrigerator temperatures of between 47 and 52 degrees throughout a 31 day test period.

A plurality of magnetic pads were placed on a first wooden rack with their north or negative side facing upwardly, whereby the negative magnetic field projected upwardly.

A second wooden rack was positioned below the first and was also provided with a plurality of magnetic pads, wherein these pads were arranged having their south or positive side facing upwardly so that the positive magnetic field projected upwardly therefrom.

Finally, the last rack was placed at the bottom of the refrigerator compartment.

A total of six magnetic pads was provided to establish an area of thirty-six square inches on each rack. Each pad was formed having two plastic sheets six inches square with three flexible magnetic strips sandwiched therebetween and positioned so that the three magnetic strips were fixed having their negative side facing in one direction and the south in the opposite direction.

Approximately six pads were placed on the first wooden rack with the north magnetic side facing upwardly and the south magnetic side facing downwardly into the wooden rack. A second group of magnetic pads were placed on the second wooden rack with the south magnetic side facing upwardly, just the reverse of the magnetic pads on the first rack. The bottom rack adjacent the bottom portion of the refrigerator compartment was left bare and thus was not effected by the other magnetic fields.

On each rack was placed the same food products in the same amounts; that is, one container of yogurt was placed on the negative admitting magnetic pads which covered the first rack, and a second container of yogurt was placed on the positive admitting magnetic pads covering the second wooden rack. The third container of yogurt was placed on the magnetic free third rack. Three of the freshly cut quarter sections were then placed respectively on each rack. This was followed by placing one peach on each of the respective racks. Each of the "Devine Tom" tomatoes were individually placed on each respective rack and a pair of kiwi fruits were then placed on the north rack, south rack and bottom magnetic-free rack. A group of the smaller cherry type tomatoes were also placed on the respective racks along with groups of strawberries. The cherry tomatoes and the strawberries were used for periodic taste-testing as well as for smell and freshness. The foods on the racks were checked approximately every two days. In a week to ten days after starting the test procedure it was noticeably clear that food exposed to the north magnetic field had still maintained their size and color better than the other food-products on the south magnetic rack and the bottom magnetic-free rack. At this time a taste test was taken with strawberries and cherry tomatoes. Again, there was a noticeable positive indication that the foods sampled from the negative rack were superior in taste, texture and appearance. It was also noticed that after two weeks visible growth of mold or fungus began to appear on foods stored on the south magnetic rack and to a lesser degree on food stored on the third non-magnetic rack. After three weeks the growth was so obvious that the food on the second and third racks was not considered edible, however, food from the first (negative) rack was still edible. At the end of the 31 day test period the food stored on the second and third racks was too rotten to even smell and the food on the first rack was just beginning to show signs of mold and fungus.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What I claim is:

1. A method of extending the shelf life of food products, comprising the steps of:

forming a magnetic mat having a magnetic north side and a magnetic south side;

arranging said magnetic mat for mounting on a shelf or in a storage bin with the magnetic north side of said mat being positioned outwardly therefrom, whereby the negative magnetic field of the north side radiates outwardly therefrom;

positioning food products within the negative magnetic field, whereby the negative magnetic field impinges on the food products;

providing a refrigerated environment in which both the magnetic mat and food products are exposed to cold air, wherein said magnetic mat is formed having a plurality of openings therein, whereby cold air from said refrigerated environment is allowed to pass through said openings;

subjecting said magnetic pad to a selected low temperature, whereby the density of the negative magnetic field emanating from the magnetic north side of said magnetic pad is increased within the refrigerated environment;

wherein said magnetic pad comprises:
- a plurality of elongated magnetic strips placed side-by-side in parallel spaced relation to each other, whereby elongated open channels are defined;
- a first cover sheet fixedly secured to the magnetic north side of said magnetic strips; and
- a second cover sheet fixedly secured to the magnetic south side of said magnetic strips, whereby said magnetic strips are interposed between said first and second cover sheets;

said first and second cover sheets being formed having a plurality of apertures positioned over said channels to define air passages.

2. The method as recited in claim 1, wherein said magnetic pad is formed having a plurality of elongated magnetic webbed strips that are woven together to define said magnetic pad.

3. The method as recited in claim 1, wherein said openings are defined as a plurality of elongated channels by which cold air is circulated through said channels.

4. The method as recited in claim 1, including the step of selectively storing food products selected from the group consisting of fruits, vegetables, and meats.

* * * * *